US008812140B2

(12) United States Patent
Huang et al.

(10) Patent No.: US 8,812,140 B2
(45) Date of Patent: Aug. 19, 2014

(54) SIGNAL TRANSFORMING METHOD, TRANSFORMING DEVICE THROUGH AUDIO INTERFACE AND APPLICATION PROGRAM FOR EXECUTING THE SAME

(75) Inventors: Wei-Chun Huang, Taipei (TW); Tsung-Hsing Hsieh, Taipei (TW)

(73) Assignee: Jogtek Corp., Taipei (TW)

( * ) Notice: Subject to any disclaimer, the term of this patent is extended or adjusted under 35 U.S.C. 154(b) by 255 days.

(21) Appl. No.: 13/108,620

(22) Filed: May 16, 2011

(65) Prior Publication Data

US 2012/0296457 A1    Nov. 22, 2012

(51) Int. Cl.
H04M 1/02 (2006.01)
H04M 1/725 (2006.01)
G06F 3/00 (2006.01)

(52) U.S. Cl.
CPC .................................. *H04M 1/7253* (2013.01)
USPC .......... 700/94; 455/557; 455/149; 455/414.4; 455/41.2

(58) Field of Classification Search
CPC ..................... H04M 1/72527; H04M 1/72558; H04M 1/0262; H04M 1/72575; H04M 1/0256; G06F 1/1632; G06F 1/265; G06F 3/16; H04B 1/3883
See application file for complete search history.

(56) References Cited

U.S. PATENT DOCUMENTS

| | | | |
|---|---|---|---|
| 5,910,978 A * | 6/1999 | Maytal et al. ............... | 379/93.01 |
| 6,526,287 B1 * | 2/2003 | Lee .............................. | 455/556.1 |
| 7,783,065 B2 * | 8/2010 | Navid ........................... | 381/311 |
| 7,831,738 B2 | 11/2010 | Rofouguran | |
| 2001/0020975 A1 * | 9/2001 | Kerai et al. ................. | 348/14.01 |
| 2004/0001553 A1 * | 1/2004 | Steentra et al. ............... | 375/260 |
| 2005/0075134 A1 * | 4/2005 | Steenstra et al. ............. | 455/557 |
| 2005/0247787 A1 * | 11/2005 | Von Mueller et al. ........ | 235/449 |
| 2006/0197651 A1 * | 9/2006 | Lee et al. ..................... | 340/5.61 |
| 2007/0155313 A1 * | 7/2007 | Goldberg et al. ............ | 455/3.06 |

FOREIGN PATENT DOCUMENTS

| | | |
|---|---|---|
| CN | 2812220 Y | 8/2006 |
| WO | WO9811686 A2 | 3/1998 |
| WO | WO2006058173 A2 | 6/2006 |

OTHER PUBLICATIONS

Taiwan Official Action issued on Dec. 19, 2013.

* cited by examiner

*Primary Examiner* — Curtis Kuntz
*Assistant Examiner* — Thomas Maung
(74) *Attorney, Agent, or Firm* — Chun-Ming Shih; HDLS IPR Services

(57) ABSTRACT

A signal transforming method receives external analog audio signal through an audio I/O interface on a mobile device. The mobile device installs an application program therein, and the mobile device transforms the received analog audio signal into a digital signal according to a predetermined decoding reference via the application program. The mobile device can then execute corresponding works according to the transformed digital signal. In the other hand, the mobile device can also transform any type of digital signal into analog audio signal and transmits and receives the transformed analog audio signal via the audio I/O interface on the mobile device, therefore, the arrangement of other data transmitting interfaces of the mobile device can be saved.

5 Claims, 4 Drawing Sheets

SIGNAL TRANSFORMING METHOD, TRANSFORMING DEVICE THROUGH AUDIO INTERFACE AND APPLICATION PROGRAM FOR EXECUTING THE SAME

BACKGROUND OF THE INVENTION

1, Field of the invention

The invention related to a transforming method and a transforming device, and in particular to a transforming method and a transforming device through audio interface, and an application program used in the transforming device to perform the transforming method.

2, Description of Prior Art

Electrical device is very popular today, especially many kinds of mobile device, such as mobile phone, personal digital assistant (PDA), MP3 player, Tablet, and etc, are used very commonly and generally around people.

The most essential factors of electrical device are data storing and data transmitting, user can easily accept a new electrical device when data transmitting is more convenient and transmitting rate is faster. If data transmitting is convenient and the transmitting rate is fast, data can be easily added to the electrical device to use, it is to say, application of the electrical device for user is friendly.

However, electrical devices are developed toward to intellectual type now, the development makes data size bigger and makes content of the electrical devices more complicated, further, it also affects transmitting way of the electrically devices. Electrical devices now usually transmit data via universal serial bus (USB) 2.0 interface, when the data size of the electrical devices is bigger day by day, the transmitting rate according to the USB 2.0 interface can't satisfy user now. Therefore, some electrical devices employ USB 3.0 interface to transmit data.

Further, some electrical devices are complied with customized standards interface to transmit data for security, preventing pirate, and other reasons. For example, products manufactured by Apple corp. adopt 30 pins dock connector to connect with external device to transmit data.

As mentioned above, it should be noticed is that if user wants to transmit data between different electrical devices which apply different transmitting interfaces, more than one hardware devices applied different transmitting interfaces are needed, it is very inconvenient for user. If user has a plurality of electrical devices, and each of the plurality of electrical devices has different transmitting interface, then those electrical devices can't use a common peripheral device, namely the user should spend additional money to buy another peripheral device which has the same function. For user, it is very wasteful.

Therefore, how to transmit data between electrical devices through a common interface arranged in every electrical device, so as to facility user and reduce the cost of user, is an important question in development for researchers.

SUMMARY OF THE INVENTION

The invention is to provide a signal transforming method, device through audio interface and an application program used thereon, the present invention transforms every digital signal into analog audio signal, and to transmit and receive the transformed analog audio signal via an audio I/O interface on a mobile device.

According to the present invention, the signal transforming method receives external analog audio signal through an audio I/O interface on a mobile device. The mobile device installs an application program therein, and the mobile device transforms the received analog audio signal into a digital signal according to a predetermined decoding reference via the application program. The mobile device can then execute corresponding works according to the transformed digital signal.

In comparison with prior art, the present invention is used between a signal transforming device and a mobile device, it transforms any digital data, files and control commands of the mobile device into analog audio signal, and transmits the transformed analog audio signal via audio I/O interface (for example, earphone interface or microphone interface) of the mobile device. In the other hand, the mobile device can receives traditional audio signal, and recoveries the received audio signal back to ordinary, meaningful digital data, files or control commands via internal application program.

Therefore, the arrangement of other data transmitting interfaces of the mobile device can be saved, and cost of the mobile device can also be reduced. Further, the audio I/O interface such as earphone interface or microphone interface is very universal and normal in every mobile device, there is no compatible problem for transmitting data through analog audio signal.

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1A:
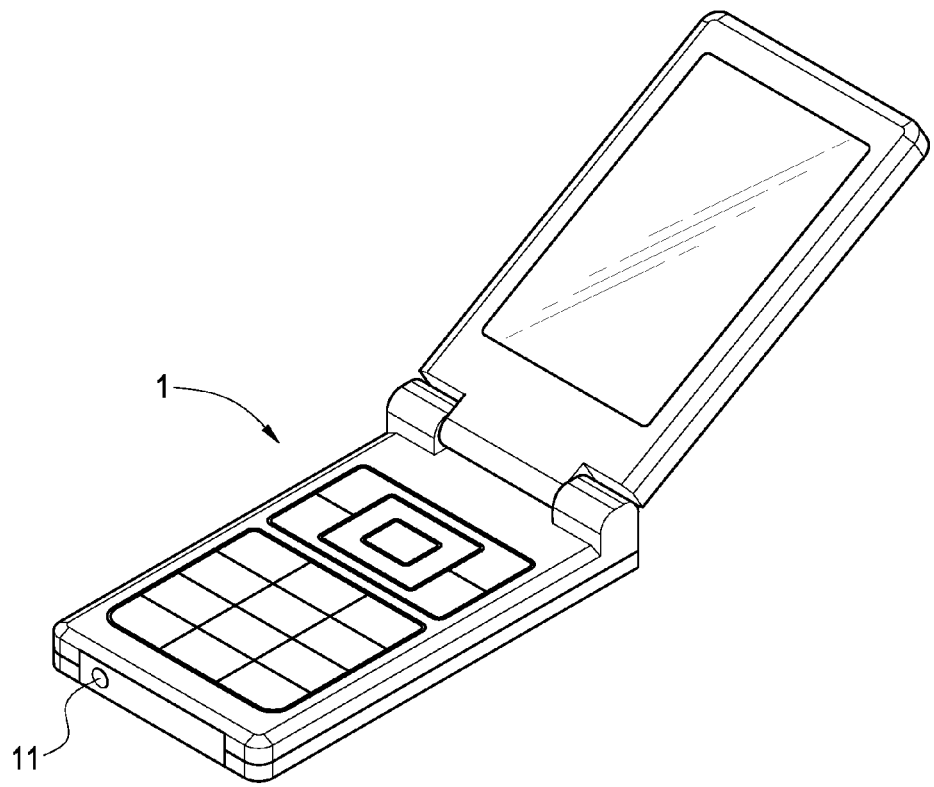
FIG. 1A is a schematic view of a mobile device of a preferred embodiment according to the present invention.
Figure 1B:
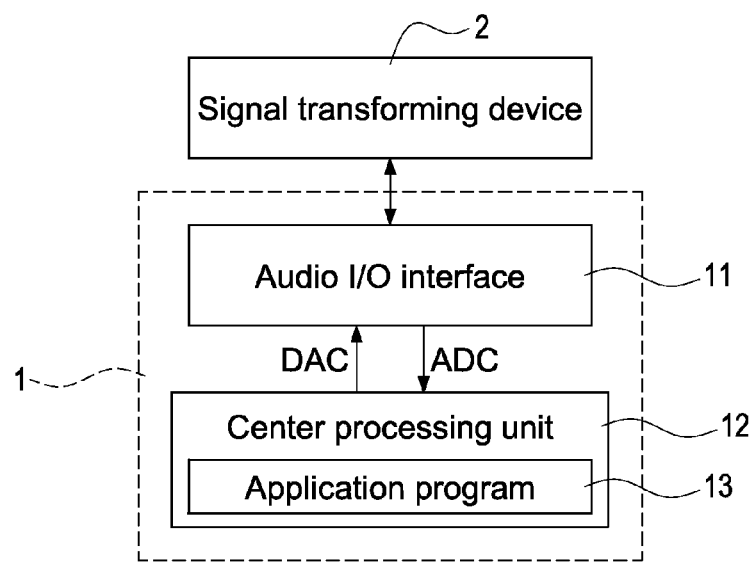
FIG. 1B is a block view of a mobile device of a preferred embodiment according to the present invention.

FIG. 1A and FIG. 1B are schematic view and block view of a mobile device of a preferred embodiment according to the present invention. The mobile device 1 in the present invention has an audio I/O interface 11 thereon, and the mobile device 1 also has a central processing unit (CPU) 12 therein, wherein the audio I/O interface 11 electrically connects to the CPU 12. The audio I/O interface 11 and the CPU 12 mentioned above are traditional hardware unit of ordinary mobile devices, it is to say, the mobile device 1 in the present invention can be an ordinary mobile device, such as a mobile phone, personal digital assistant, tablet, and so on, there are no further hardware modifications of the mobile device 1, the signal transforming method in the present invention can be used directly with any ordinary mobile device.

An application program 13 is installed in the CPU 12, the mobile device 1 can execute the signal transforming method via the CPU 12 when the application program 13 is executed. The mobile device 1 connects to a signal transforming device 2 externally via the audio I/O interface 11, such as an earphone output interface and/or a microphone input interface. It should be mentioned that audio output and audio input can be performed by two separated unit, and they can also be performed together via the audio I/O interface 11, this example is not intended to limit the scope of the present invention.

Figure 2A:
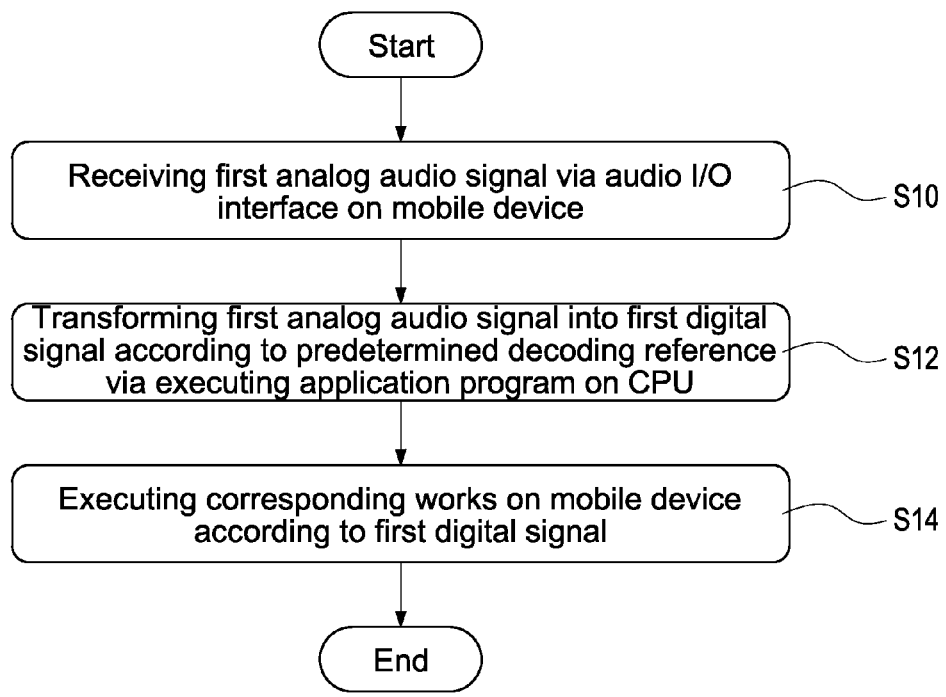
FIG. 2A is a flowchart of a first embodiment according to the present invention.
Figure 4:
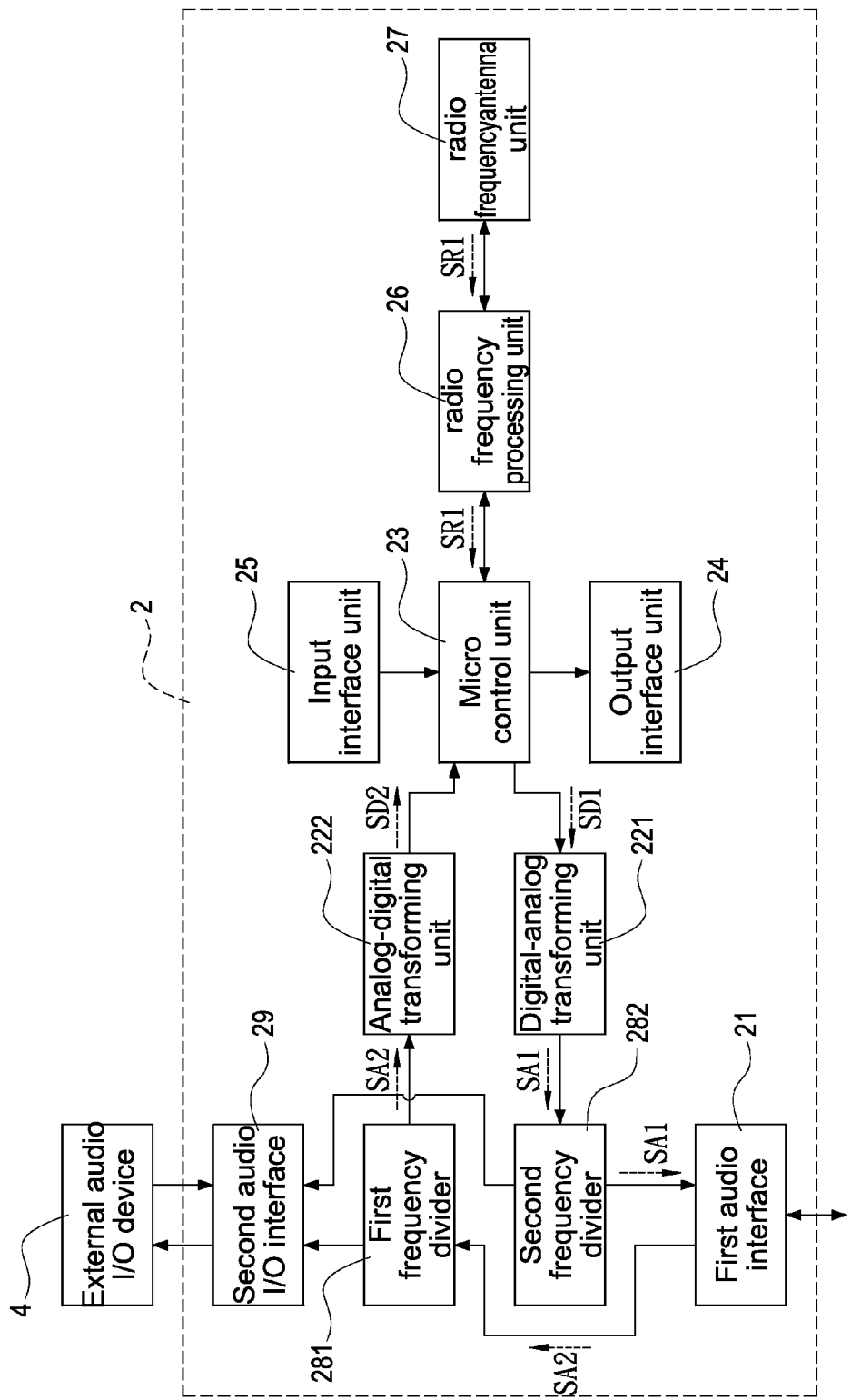
FIG. 4 is a block view of a signal transforming device of a preferred embodiment according to the present invention.

FIG. 2A is a flowchart of a first embodiment according to the present invention. Firstly, the mobile device 1 electrically connects to the signal transforming device 2 via the audio I/O interface 11, and the mobile device 1 receives a first analog audio signal SA1 (as shown in FIG. 4) from the signal transforming device 2 via the audio I/O interface 11 (step S10). Secondly, The CPU 12 executes the application program 13 to transform the received first analog audio signal SA1 into a first digital signal SD1 according to a predetermined decoding reference (step S12). In particularly, the mobile device 1 performs analog-to-digital convert procedures via the application program 13, therefore, the mobile device 1 needs not to arrange additional analog-to-digital converters therein, it is to say, the mobile device 1 can be replaced by any other mobile device.

The first analog audio signal SA1 can be audio signal without any meanings, and the first analog audio signal SA1 can be recovered back to ordinary, meaningful digital data, files or control commands according to the predetermined decoding reference. For example, if content of the first analog audio signal SA1 is "Do, Re, Do, Do, Re", therefore, the first analog audio signal SA1 can be recovered back to digital data with content "01001" according to the predetermined decoding reference, but not intended to limit the scope of the present invention.

Finally, the mobile device 1 executes corresponding works according to the transformed first digital signal SD1 (step S14). For example, if the first digital signal SD1 is a control command, the mobile device 1 executes a corresponding work according to the control command; if the first digital signal SD1 is a file, the mobile device 1 plays or saves the file.

Figure 2B:
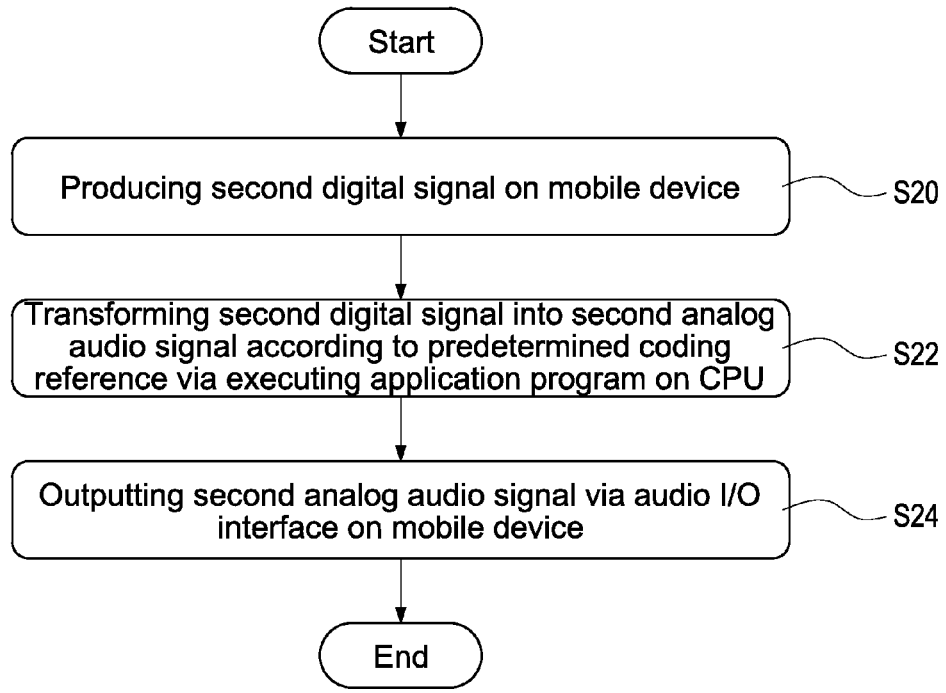
FIG. 2B is a flowchart of a second embodiment according to the present invention.

FIG. 2B is a flowchart of a second embodiment according to the present invention. This embodiment is against to the first embodiment mentioned above. Firstly, the mobile device 1 produces a second digital signal SD2 (as shown in FIG. 4) by itself (step S20), for example, the second digital signal SD2 is a digital data, file or control command. Secondly, the CPU 12 executes the application program 13 to transform the second digital signal SD2 into a second analog audio signal SA2 (as shown in FIG. 4) according to a predetermined coding reference (step S22).

In should be mentioned that, the mobile device 1 performs digital-to-analog convert procedures via the application program 13, in particularly, the mobile device 1 uses the digital-to-analog convert procedures to transform ordinary, meaningful digital data into audio signal without any meanings. For example, if content of the second digital signal SD2 is "00100", therefore, the second digital signal SD2 can be transformed into analog audio data with content "Do, Do, Re, Do, Do" according to the predetermined coding reference, but not intended to limit the scope of the present invention.

Finally, the mobile device 1 outputs the second analog audio signal SA2 to the signal transforming device 2 which is electrically connected to the mobile device 1 via the audio I/O interface 11 (step S24).

Figure 3:
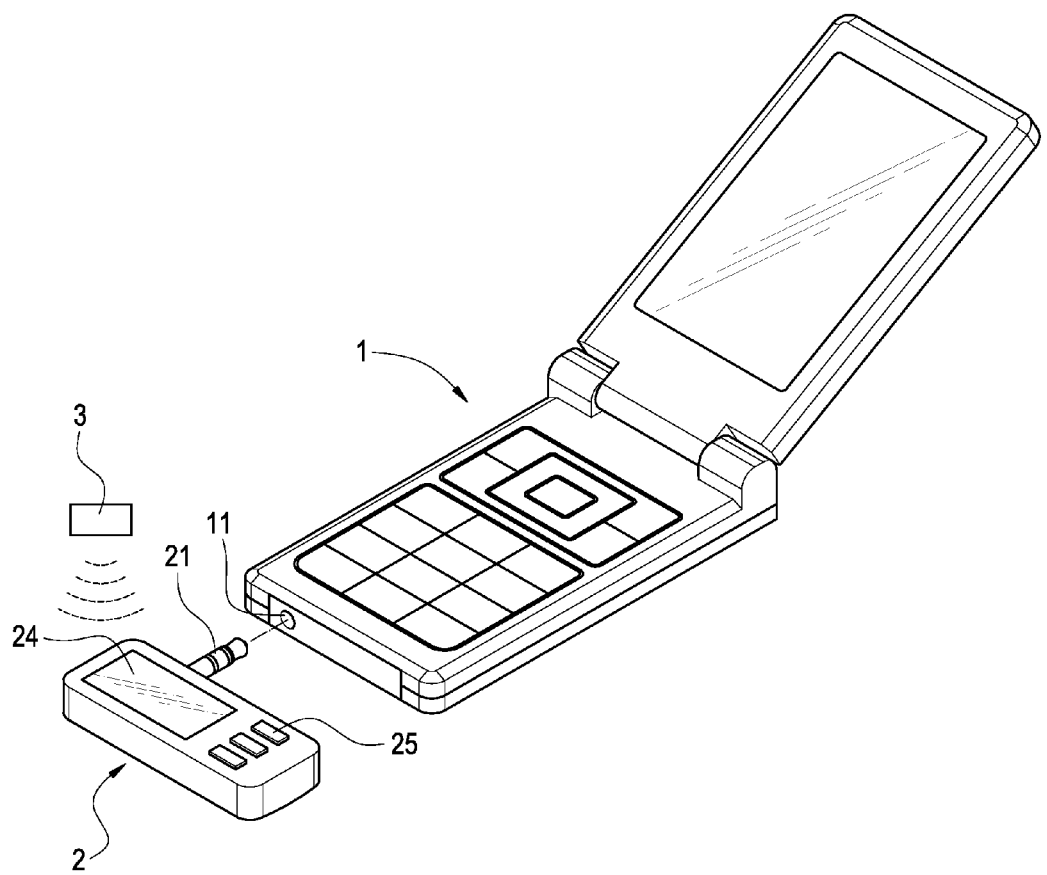
FIG. 3 is a schematic view of connection of a preferred embodiment according to the present invention.

FIG. 3 is a schematic view of connection of a preferred embodiment according to the present invention. The signal transforming device 2 mainly comprises a first audio I/O interface 21 (for example, a 3.5 mm earphone/microphone I/O interface), the first audio I/O interface 21 is arranged to plug into the audio I/O interface 11 of the mobile device 1, therefore, the signal transforming device 2 electrically connects to the mobile device 1, so as to transmit and receive the first analog audio signal SA1 and the second analog audio signal SA2 with the mobile device 1.

FIG. 4 is a block view of the signal transforming device of a preferred embodiment according to the present invention. The signal transforming device 2 comprises the first audio I/O interface 21, a digital-analog transforming unit 221, an analog-digital transforming unit 222, and a micro control unit (MCU) 23.

The digital-analog transforming unit 221 electrically connects to the MCU 23 and the first audio I/O interface 21. The signal transforming device 2 produces the first digital signal SD1, for example, a digital data, file or control command, by the MCU 23. The produced first digital signal SD1 is transmitted to the digital-analog transforming unit 221, so as to transform the produced first digital signal SD1 into the first analog audio signal SA1 via a digital-to-analog convert procedure according to the predetermined coding reference, and outputs the transformed first analog audio signal SA1 to the mobile device 1 via the first audio I/O interface 21.

The analog-digital transforming unit 222 electrically connects to the MCU 23 and the first audio I/O interface 21. The first audio I/O interface 21 receives the second analog audio signal SA2 from the mobile device 1 to transmit the received second analog audio signal SA2 to the analog-digital transforming unit 222, therefore, the analog-digital transforming unit 222 transforms the second analog audio signal SA2 into the second digital signal SD2 via an analog-to-digital convert procedure according to the predetermined decoding reference, and transmits the transformed second digital signal SD2 to the MCU 23.

The signal transforming device 2 of the present invention further comprises an output interface unit 24, the output interface unit 24 electrically connects to the MCU 23 and can be, for example, a speaker or a monitor, and is used to display the first digital signal SD1 and the second digital signal SD2 (such as a digital video file) on the signal transforming device 2, but not intended to limit the scope of the present invention.

In particularly, the signal transforming device 2 can further comprise an input interface unit 25, and the input interface unit 25 electrically connects to the MCU 23. User can provide a parameter to the MCU 23 of the signal transforming device 2 via the input interface unit 25, therefore, the MCU 23 can produce the first digital signal SD1 by reference to the inputted parameter.

For example, the input interface unit 25 can be a button unit facilitating user to select digital data or files stored in the signal transforming device 2, or to send control commands externally. For second example, the input interface unit 25 can be a barcode reader facilitating user to scan external barcode data. For another example, the input interface unit 25 can also be a camera unit facilitating user to take external image data to the MCU 23 for producing the corresponding first digital signal SD1 according to the image data. Furthermore, the input interface unit 25 can also be a credit card accessing unit facilitating user to sense external credit card data from a credit card, and the MCU 23 can produce the first digital signal SD1 according to the credit card data. The above examples are just preferred embodiments, not intended to limit the scope of the present invention.

As mentioned above, the MCU 23 mainly receives parameters, and produces the first digital signal SD1 according to the received parameters. As shown in FIG. 4, the signal transforming device 2 can further comprises a radio frequency (RF) processing unit 26 and a radio frequency antenna unit 27, the RF processing unit 26 electrically connects to the RF processing unit 26.

In this embodiment, the signal transforming device 2 receives radio frequency signal SR1 from an external radio frequency tag 3 (as shown in FIG. 3) via the RF antenna unit 27, and processes the received RF signal SR1 via the RF processing unit 26. The RF processing unit 26 further transmits the processed RF signal SR1 to the MCU 23, and the MCU 23 produces the first digital signal SD1 according to the processed RF signal SR1.

It should be mentioned is, the signal transforming device 2 connects with the mobile device 1 via the first audio I/O interface 21 and the audio I/O interface 11. For retaining original earphone/microphone functions of the mobile device 2, the signal transforming device 2 can further arrange a second audio I/O interface 29, the mobile device 1 can connect to the signal transforming device 2 and connect an external audio I/O device 4, such as an earphone, through the second audio I/O interface 29 on the signal transforming device 2.

The signal transforming device 2 further comprises a first frequency divider 281 and a second frequency divider 282, the first frequency divider 281 electrically connects between the first audio I/O interface 21 and the analog-digital transforming unit 222; the second frequency divider 282 electrically connects between the first audio I/O interface 21 and the digital-analog transforming unit 221; and the second audio I/O interface 29 electrically connects to the first frequency divider 281 and the second frequency divider 282.

In this embodiment, the first analog audio signal SA1 and the second analog audio signal SA2 are audio signal according to a first frequency. In particularly, the first frequency is an inaudible frequency for person, user may not beset when the signal transforming device 2 transmitting audio according to the first frequency.

The first frequency divider 281 receives the second analog audio signal SA2 from the first audio I/O interface 21, and the first frequency divider 281 filters the signal according to the first frequency, and transmits the filtered signal to the analog-digital transforming unit 222 to transform. Further, the first frequency divider 281 filters signal according to a second frequency (audible frequency in this embodiment), and outputs the filtered signal to the external audio I/O device 4 via the second audio I/O interface 29. Therefore, user can hear the second analog audio signal SA2 by using the external audio I/O device 4.

The second frequency divider 282 receives the first analog audio signal SA1 from the digital-analog transforming unit 221, and the second frequency divider 282 filters the signal according to the first frequency, and transmits the filtered signal to the first audio I/O unit 21 to output externally to the mobile device 1. Further, the second frequency divider 282 filters the signal according to the second frequency, and outputs the filtered signal to the external audio I/O device 4 via the second audio I/O interface 29.

As the skilled person will appreciate, various changes and modifications can be made to the described embodiment. It is intended to include all such variations, modifications and equivalents which fall within the scope of the present invention, as defined in the accompanying claims.

What is claimed is:

1. A signal transforming device through audio interface electrically connected to a mobile phone via an audio I/O interface jack of the mobile phone, the mobile phone installed an application program therein, the signal transforming device comprising:

a micro control unit for producing a first digital signal;
    a digital-analog transforming unit electrically connected to the micro control unit, receiving the first digital signal produced by the micro control unit to transform the received first digital signal into a first analog audio signal according to a predetermined coding reference;
    an audio I/O interface plug;
    a first frequency divider electrically connected between the audio I/O interface plug and an analog-digital transforming unit, wherein the first frequency divider receives a second analog audio signal from the audio I/O interface plug to filter signal according to a first inaudible audio frequency, and transmits the filtered second analog audio signal to the analog-digital transforming unit to transform;
    the analog-digital transforming unit electrically connected to the micro control unit, receiving the filtered second analog audio signal to transform the received filtered second analog audio signal into a second digital signal according to a predetermined decoding reference, and transmitting the transformed second digital signal to the micro control unit to be processed;
    a second frequency divider electrically connected between the audio I/O interface plug and the digital-analog transforming unit, wherein the second frequency divider receives the first analog audio signal from the digital-analog transforming unit to filter the signal according to the first inaudible audio frequency, and transmits the filtered first analog audio signal to the audio I/O interface plug to output to the mobile phone; and
    an audio I/O interface electrically connected to the first frequency divider and the second frequency divider, wherein the signal transforming device electrically connects to an external audio I/O device via the audio I/O interface, the audio I/O interface receives signal according to a second audio frequency filtered from the first frequency divider and the second frequency divider to output the filtered signal to the external audio I/O device,
    wherein, the signal transforming device electrically connects to the audio I/O interface jack of the mobile phone via the audio I/O interface plug, so as to transmit the filtered first analog audio signal and the second analog audio signal with the mobile phone,
    a radio frequency processing unit electrically connected to the micro control unit; and
    a radio frequency antenna unit electrically connected to the radio frequency processing unit;
    wherein, the signal transforming device receives a radio frequency signal from an external radio frequency tag via the radio frequency antenna unit, and the radio frequency processing unit processes the received radio frequency signal and transmits the processed radio frequency signal to the micro control unit, and the micro control unit produces the first digital signal according to the radio frequency signal.

2. The signal transforming device of claim 1, further comprising an output interface unit electrically connected to the micro control unit, and wherein the signal transforming device displays the first digital signal and the second digital signal via the output interface unit.

3. The signal transforming device of claim 1, further comprising an input interface unit electrically connected to the micro control unit, and wherein the micro control unit produces the first digital signal by reference to a parameter provided by the input interface unit.

4. The signal transforming device of claim 3, wherein the input interface unit is a button unit or a camera unit.

5. The signal transforming device of claim 3, wherein the input interface unit is a barcode reader or a credit card accessing unit.

\* \* \* \* \*